US006000610A

United States Patent [19]

Talbott et al.

[11] Patent Number: 6,000,610

[45] Date of Patent: Dec. 14, 1999

[54] STORE SPECIFIC SHOPPING SYSTEM AND METHOD INCLUDING A MAP/SHOPPING LIST

[76] Inventors: Theresa G. Talbott; Alex F. Talbott, both of 3703 Hillsdale Rd., Louisville, Ky. 40222

[21] Appl. No.: 08/023,955

[22] Filed: Feb. 26, 1993

[51] Int. Cl.$^{6}$ .......................... G06K 15/00

[52] U.S. Cl. .......................... 235/383; 40/308; 186/52

[58] Field of Search .......................... 40/308, 904, 299; 186/52, 35; 235/383

[56] References Cited

U.S. PATENT DOCUMENTS

| | | | |
|---|---|---|---|
| 4,156,318 | 5/1979 | Economy | 40/308 |
| 4,274,567 | 6/1981 | Sawyer . | |
| 4,356,651 | 11/1982 | Barlow . | |
| 4,423,888 | 1/1984 | Addison . | |
| 4,496,058 | 1/1985 | Harris | 211/86 |
| 4,512,504 | 4/1985 | Owlett . | |
| 4,743,050 | 5/1988 | Small . | |
| 4,858,353 | 8/1989 | Krebs | 40/308 |
| 4,929,819 | 5/1990 | Collins, Jr. . | |
| 4,966,318 | 10/1990 | Dutka . | |
| 4,973,952 | 11/1990 | Malec et al. . | |
| 4,998,572 | 3/1991 | Judson . | |
| 5,047,614 | 9/1991 | Bianco . | |
| 5,111,196 | 5/1992 | Hunt . | |
| 5,127,674 | 7/1992 | Lamphere et al. . | |
| 5,154,330 | 10/1992 | Haynes | 224/277 |

OTHER PUBLICATIONS

Winn–Dixie Marketplace brochure & map.

Bigg's –True Minimum Price information brochure entitled "Your dollar is bigger at bigg's".

Robert E. Kane *Grocery List Program* Nov. 15, 1992 pp. 1–10.

*Primary Examiner*—Karl D. Frech

*Attorney, Agent, or Firm*—Woodard, Emhardt, Naughton Moriarty & McNett

[57] ABSTRACT

A personalized shopping system and method is disclosed including a portable map bearing written identifications of articles arranged in a pictorial representation corresponding to their display locations in a store. The portable map includes a written index adjacent to the pictorial representation as a cross-reference for locating articles in the store. The portable map is useable as both a shopping list for selecting articles for purchase and as an in-store directory for locating the selected articles. Also provided is a portable clipboard adapted for use with the portable map. The portable clipboard includes mounts for removably mounting the clipboard to the grocery cart, wherein the means for removably mounting is operable between a stored position for supporting the clipboard stable against a working surface and an extended position for supporting the clipboard stable on a grocery cart.

19 Claims, 7 Drawing Sheets

STORE SPECIFIC SHOPPING SYSTEM AND METHOD INCLUDING A MAP/SHOPPING LIST

BACKGROUND OF THE INVENTION

This invention relates generally to shopping aids and more specifically to a system and method including a shopping map for aiding shoppers in the selection and location of articles displayed for sale at various aisle locations in a store.

With the advent of large one-stop shopping stores selling a variety of goods ranging from food staples to hardware, and in many instances, also providing a variety of personal services, the once simple shopping trip to the corner grocery store has evolved into a complex task which can easily overwhelm the ordinary shopper. As a result, various electronic and/or computerized shopping aids and systems have recently been developed to assist the shopper with the complex and time consuming task of shopping, examples of which can be found in patents to Collins Jr., U.S. Pat. No. 4,929,819; Malec U.S. Pat. No. 4,973,952; Bianco U.S. Pat. No. 5,047,614 and Hunt, U.S. Pat. No. 5,111,196.

Unfortunately, like the complex stores for which these systems were designed, these shopping aids and systems too can overwhelm, rather than aid, the ordinary shopper. As a result, shoppers today must not only spend time becoming familiar with the layout of a particular store, but also must spend valuable time learning how to operate the associated electronic and/or computerized shopping aids. Further, because of their increased complexity and associated costs, the above-described shopping aids and systems are less likely to find widespread use in shopping stores.

Therefore, a need exists for an improved shopping aid and system to assist the ordinary shopper with shopping in today's stores. Such a shopping aid and system should be simple in design and should provide instant familiarity to the ordinary shopper. Preferably, the shopping aid and system would allow for much of the time spent organizing and planning for a shopping trip to be performed away from the store, for example at home, to minimize time spent in the store. Therefore, such a shopping aid and system should also be easily portable.

SUMMARY OF THE INVENTION

According to one embodiment of the present invention, a system is provided for aiding shoppers in the selection and location of articles displayed for sale at various aisle locations in a store, including a store having a plurality of aisles therein and articles displayed at various display locations along the plurality of aisles, and a portable map including a display surface bearing store specific indicia arranged in a pictorial representation of the plurality of aisles. The store specific indicia includes first written identifications of the articles arranged at locations in the pictorial representation corresponding to the display locations of the articles along the plurality of aisles. The portable map is useable as a shopping list for selecting articles purchased from the store and as an in-store directory for locating the selected articles in the store.

According to another embodiment of the present invention, a method is provided for aiding shoppers in the selection and location of articles for sale at various aisle locations in a store is disclosed, including the steps of providing a portable map including a display surface bearing store specific indicia arranged in a pictorial representation of a plurality of aisles, wherein the store specific indicia includes written identifications of the articles arranged at locations in the pictorial representation corresponding to the display locations of the articles along the plurality of aisles, marking at least one selected written identification on the portable map corresponding to articles selected for purchase from the store, and following the pictorial representation along the aisles to locate the selected articles from the location of the marked written identifications on the pictorial representation.

According to yet another embodiment of the present invention, a system is provided for aiding shoppers in the selection and location of articles displayed for sale at various aisle locations in a store is disclosed, including a portable map having a display surface bearing store specific indicia arranged in a pictorial representation of a plurality of aisles in the store and a portable clipboard for receiving and supporting the portable map thereon. The store specific indicia includes written identifications of the articles arranged at locations in the pictorial representation corresponding to the display locations of the articles along the plurality of aisles. The portable clipboard includes means for removably mounting the portable clipboard to rails of a grocery cart, wherein the means for removably mounting is operable between a stored position for supporting the clipboard stable against a working surface and an extended position for supporting the clipboard stable mounted on the grocery cart.

One object of the present invention is to provide an improved shopping aid and system for aiding shoppers in the selection and location of articles for sale at various aisle locations in a store.

Another object of the present invention is to provide an improved method for aiding shoppers in the selection and location of articles for sale at various aisle locations in a store.

Yet another object of the present invention is to provide a shopping aid and system which is simple in design and which becomes readily familiar to the ordinary shopper.

Still another object of the present invention is to provide a shopping aid and system which is easily transportable both within and outside the store.

Still yet another object of the present invention is to provide a personalized shopping map usable as both a shopping list for selecting articles for purchase from a store and as an in-store directory for locating the selected articles in the store.

Still yet another object of the present invention is to provide a portable shopping map in combination with a portable clipboard, wherein the clipboard is operable to support the shopping map stable both against a working surface and on a grocery cart.

These and other related objects and advantages will become apparent from the following drawings and written description.

DESCRIPTION OF THE PREFERRED EMBODIMENT

Figure 1:
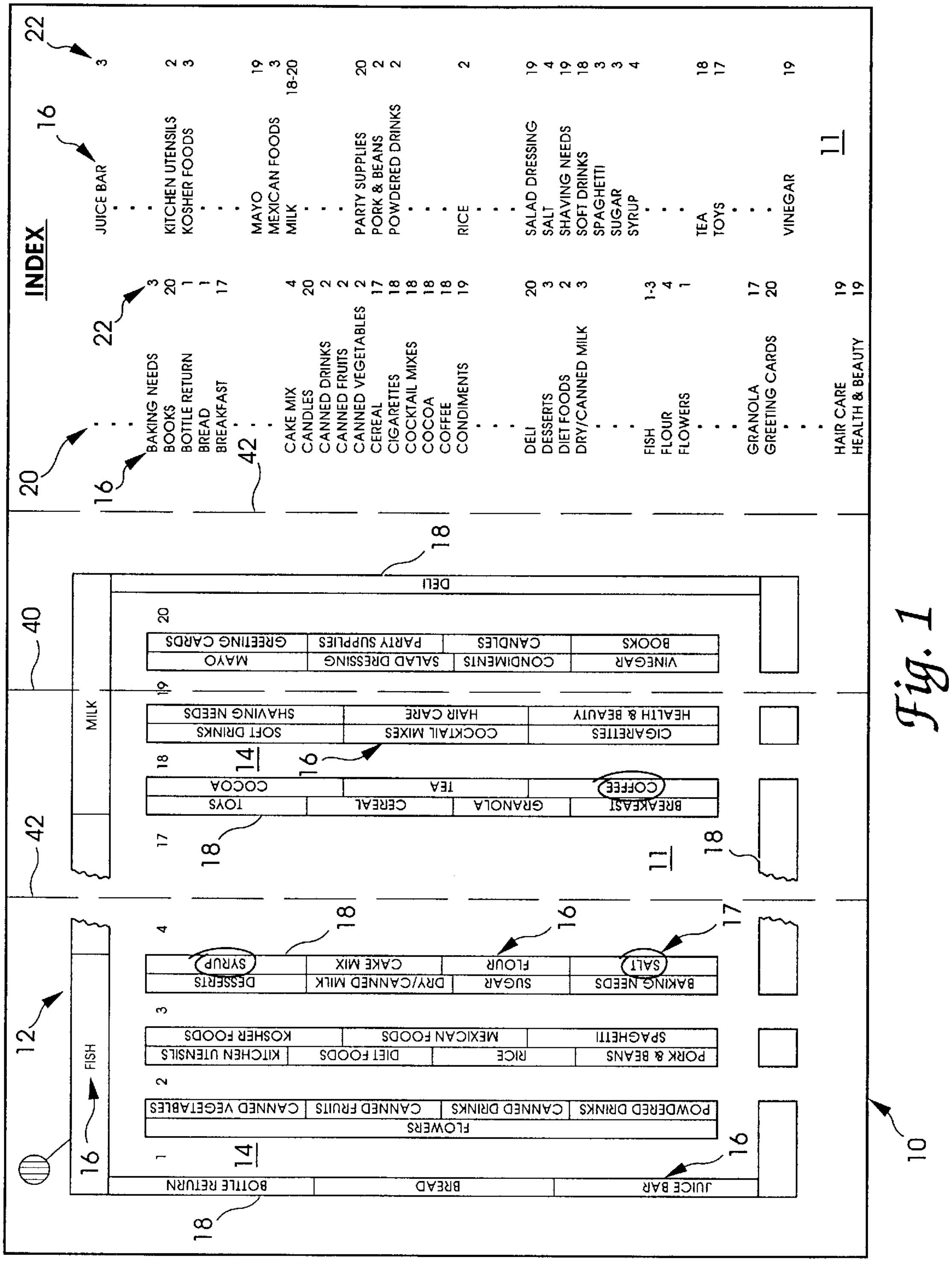
FIG. 1 is an illustration of a shopping map, according to one embodiment of the present invention, bearing store specific indicia arranged in a pictorial representation of a plurality of aisles.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and method, and such further applications of the principles of the invention as illustrated therein being contemplated as would normally occur to one skilled in the art to which the invention relates.

Referring now to FIG. 1, a portable shopping map 10 is illustrated which includes a display surface 11 bearing store specific indicia arranged in a pictorial representation 12 of aisles in a store. Portable map 10 aids shoppers in the selection and location of articles displayed for sale at various aisle locations in a store. As such, portable shopping map 10 is contemplated for use with a variety of stores which display articles for sale at various aisle locations. Because portable map 10 is specifically designed for use with a particular store or line of stores, portable map 10 and the particular store together provide a system for aiding shoppers in the selection and location of articles displayed for sale at various locations in the particular store. In the preferred embodiment, portable map 10 is illustrated specifically designed for use in a grocery store which displays food staples and other household items for sale along aisles in the store, wherein the aisles 14 depicted in pictorial representation 12 correspond to and represent aisles in the grocery store.

The store specific indicia displayed on portable map 10 includes written verbal identifications 16 of the articles for sale in the store, wherein written identifications 16 are arranged in pictorial representation 12 at locations along aisles 14 corresponding to the aisle locations of the articles displayed for sale in the grocery store. As such, portable map 10 is useable as a shopping list for selecting articles for purchase from the grocery store and as an in-store directory for locating the selected articles in the store. Preferably, articles selected for purchase are designated on portable map 10 by marking, such as with markings 17, the appropriate corresponding written identification 16; i.e., such as by circling or underlining in pencil. To enhance and further delineate the marked written descriptions, as for example made in pencil, the store specific indicia is preferably printed in a light colored ink distinct from the color of the marking instrument. In the preferred embodiment, the store specific indicia is colored in a shade of red, for example pink, to best delineate and contrast markings made in pencil.

Also included in the store specific indicia of FIG. 1 are optional outlines 18 which correspond to the various display cases containing the articles for sale in the grocery store and which further define aisles 14 in pictorial representation 12. The written identifications 16 are arranged in outlines 18 corresponding to the display locations of the articles for sale in the store.

Additionally, a written index 20 is optionally provided displayed on portable map 10 adjacent to pictorial representation 12. Written identification s 16 are arranged in alphabetical order in index 20 and are associated with written identifications 22 of aisles 14 in pictorial representation 12. Index 14 is contemplated as including further written identifications of articles not displayed in pictorial representation 12, but still associated with aisle locations 22 to provide a mechanism for locating articles in the grocery store which are not shown in pictorial representation 12. Further, additional written descriptions not shown in pictorial representation 12 can nevertheless still be arranged at locations in a pictorial representation of aisles in a store to provide a more comprehensive directory.

Figure 2:
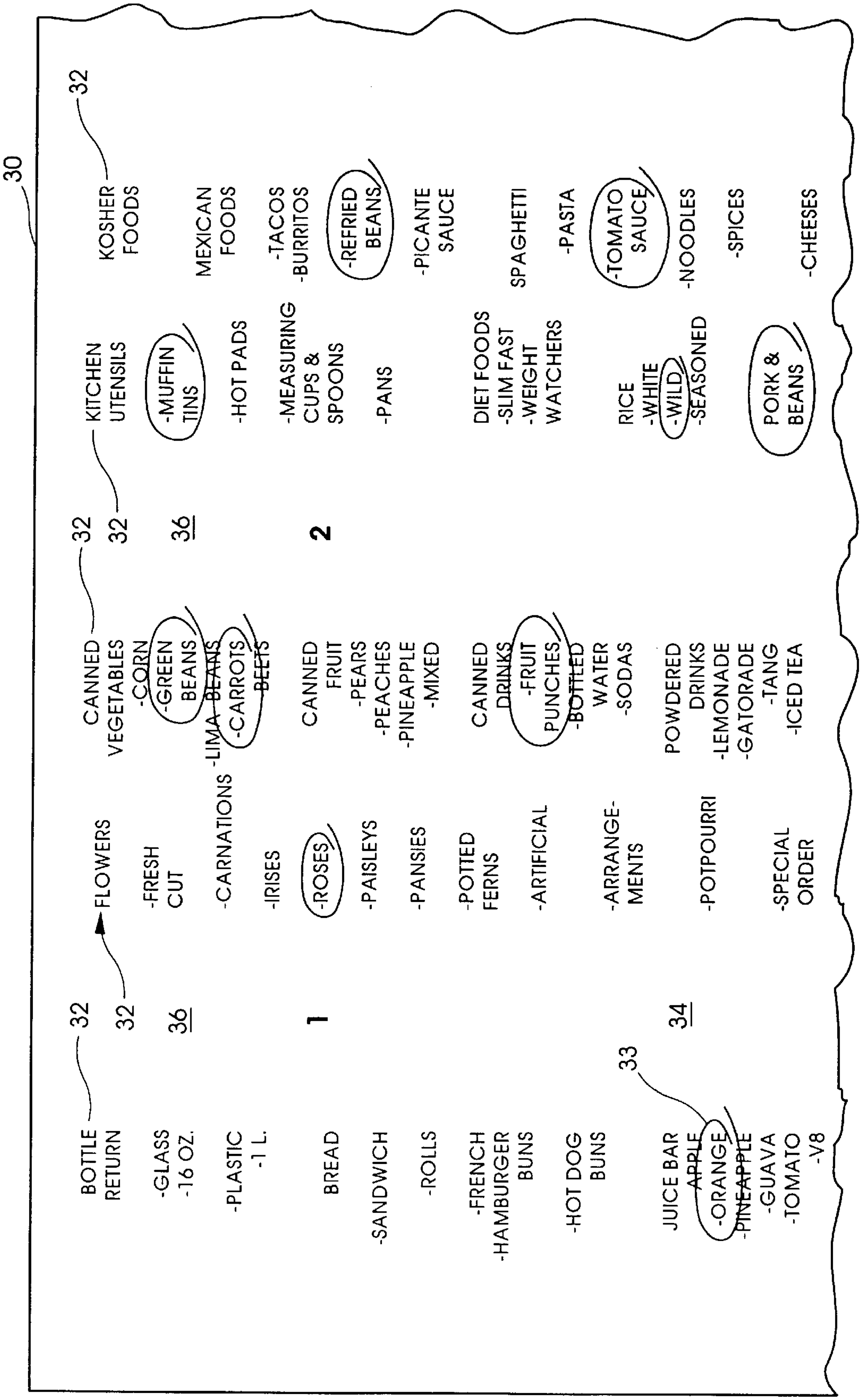
FIG. 2 is a partial top plan view of a preferred embodiment of a shopping map according to the present invention.

For example, referring now to FIG. 2, portable map 30 is illustrated including written verbal identifications 32 of articles for sale along aisles in a grocery store arranged at locations in pictorial representation 34 corresponding to the display locations of the articles. Such pictorial representation is achieved by locating and spacing the written identifications in essentially direct spacial proportion to how the actual articles in the store are located and spaced. In FIG. 2, written identifications 32 are further arranged to define aisles 36 corresponding to aisles of the store. Regardless of the particular illustration means chosen, i.e., the written identifications and outlines of FIG. 1 or the written identifications of FIG. 2, an improved shopping aid results by arranging written identifications of articles for sale in a store at locations in a pictorial representation depicting the layout of the store. The written identifications 32 are individually selected by marking, such as encircled markings 33, on the top working surface of the map/shopping list. As illustrated, the identifications are preferably verbal, such as generic identifications and/or trademark/brand identifications (e.g. V8, GATORADE, TANG, SLIM FAST, WEIGHT WATCHERS trademarks).

Referring back to FIG. 1, portable map 10 further includes a fold line 40 disposed in pictorial representation 12 approximately half way along the length of portable map 10 so that portable map 10 is easily folded in half to display a minor portion of pictorial representation 12 on its reverse side. Preferably, the fold line 40 is disposed so that when portable map 10 is folded in half, approximately one-third of pictorial presentation 12 is displayed on its reverse side. Also contemplated are fold lines 42 arranged on portable map 10 so that portable map 10 is easily foldable into thirds with pictorial representation 12 displayed on both the front and reverse sides of the folded map and the written index folded in between the front and reverse sides, but still available for reference.

In the preferred embodiment, portable map 10 is constructed of paper with the store specific indicia 16 and 18 and written index 20 pre-printed thereon. Preferably, portable map 10 is provided on 8½ by 14 inch standard paper. Such a paper size has been found to provide a sufficient quantity and size of written descriptions to promote easy reading, while still providing a manageable paper size easily transportable away from the store. Also, sufficient space is provided on pictorial representation 12 for marking in additional items not shown in pictorial representation 12 and/or written index 20. Portable map 10 can be provided in individual sheet form for distribution as a leaflet or, in the preferred embodiment, is provided in pads of 25 or 30 to provide a ready supply of portable maps to the shopper, either available in home or at the store.

Figure 3:
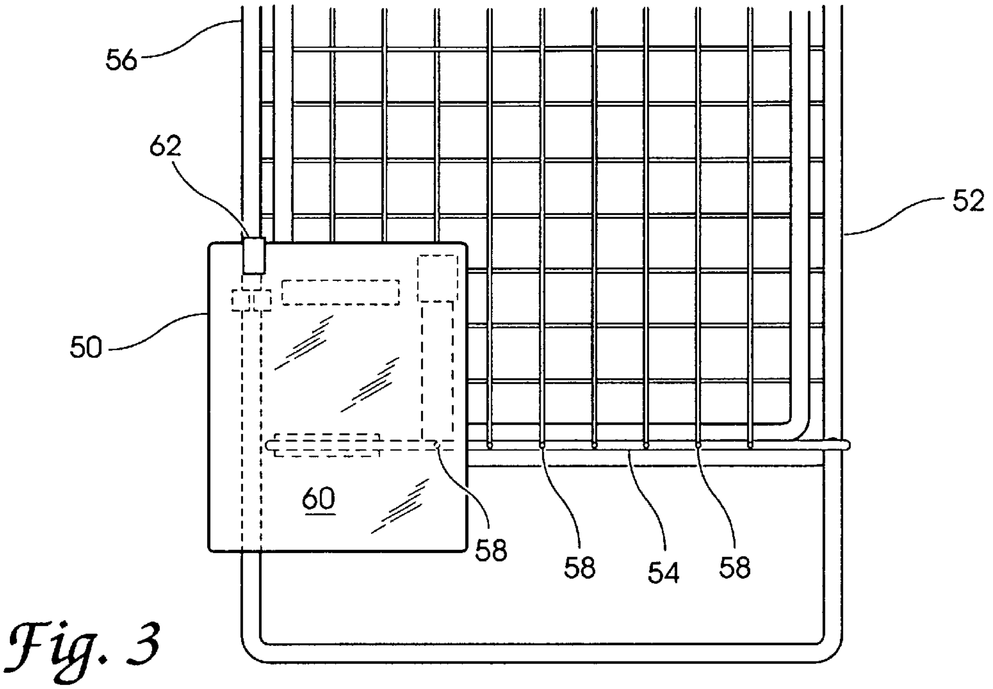
FIG. 3 is a top plan view of a portable clipboard, according to another embodiment of the present invention, removably mounted on a grocery cart.

Referring now to FIG. 3, a portable clipboard 50 is depicted for use in combination with either portable maps 10 or 30. Portable clipboard 50 is removably mountable on a grocery cart 52 which is of conventional design incorporating a wire mesh construction. Portable clipboard 50 includes means for removably mounting to the various transverse, longitudinal and vertical rails 54, 56 and 58, respectively, of grocery cart 52, wherein the mounting means is operable between stored and extended positions. As shown in FIG. 3, portable clipboard 50 is mounted to grocery cart 52 overlapping a corner thereof with the mounting means in its extended position. As such, portable clipboard 50 maximizes access to the contents of grocery cart 52 while providing a stable platform for supporting either portable map 10 or 30 thereon. Portable clipboard 50 presents a top surface 60 sized for supporting an 8½x7 inch (or 8½x14 inch or otherwise) portable map thereon. A spring clip 62 overlaps a top portion of surface 60 for restraining the map in place.

Figure 4:
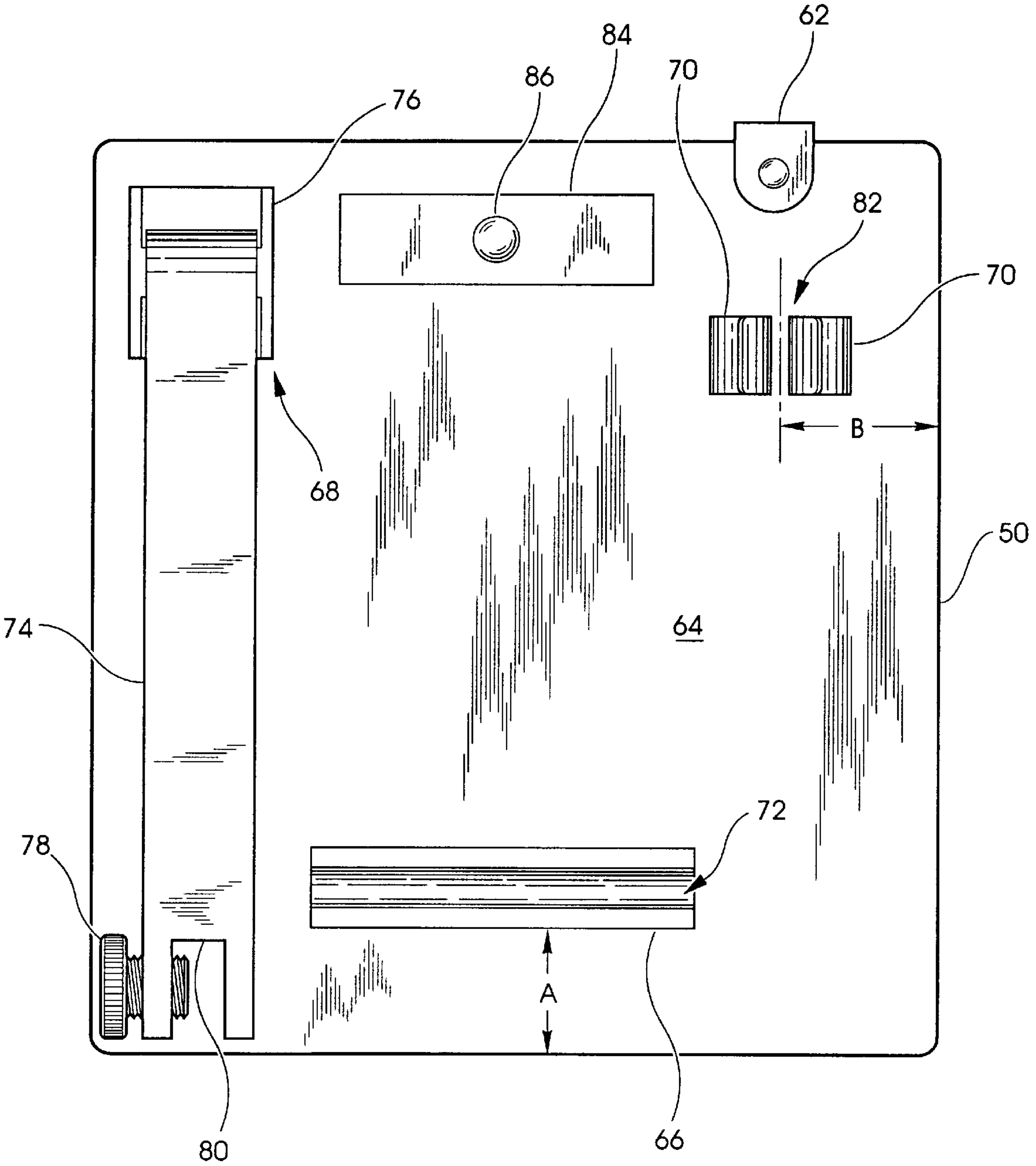
FIG. 4 is rear elevational view of the portable clipboard depicted in FIG. 3.

Referring now to FIG. 4, mounted to back surface 64 of portable clipboard 50 for removably mounting portable clipboard 50 to grocery cart 52 are transverse bracket 66, swing arm assembly 68 and clip 70. Transverse bracket 66 includes a longitudinal groove 72 for receiving a transverse rail 54 of grocery cart 52 therein. Swing arm assembly 68 includes a swing arm 74 pivotably connected to bracket 76, which is attached to back surface 64. Arm 74 includes a threadedly adjustable clamp 78 at an end thereof for clamping a vertical rail 58 of grocery cart 52 within slot 80. Swing arm 68 is moveable between a first position adjacent back surface 64 (FIG. 4) and a second extended position clamped to vertical rail 58 (FIG. 3). Clip 70 is resiliently flexible and includes an opening 82 for clipping to a longitudinal rail 56 of grocery cart 52. As such, transverse bracket 66, swing arm assembly 68 and clip 70 provide a three point base for supporting clipboard 50 stable mounted on grocery cart 52.

Because clipboard 50 is designed to be portable for use between home and store, a magnet 84 is attached near the top of back surface 64 so that clipboard 50 can be magnetically hung against a vertical working surface, such as that provided by a refrigerator. Since not all hanging surfaces are compatible with magnet 84, a receiving hole 86 is also provided for hanging clipboard 50 on a hook. Further, bracket 66, swing arm assembly 68, clip 70 and magnet 84 are all the same height so that clipboard 50 can also be supported flat against other horizontal or vertical working surfaces.

A preferred overlap is also provided for mounting clipboard 50 on grocery cart 52, which optimizes the three point stable support of clipboard 50 on grocery cart 52 while minimizing blocking access to the contents of grocery cart 52, by arranging the mounting means at particular relative locations on back surface 64. For example, transverse bracket 66 is attached to back surface 64 a distance 'A' from the bottom edge of clipboard 50 and clip 70 is attached to back surface 64 a distance 'B' from the side of clipboard 50. In the preferred embodiment, distance A is 15 to 25 percent of the length of clipboard 50 and distance B is 20 to 30 percent of the width of clipboard 50.

Figure 5:
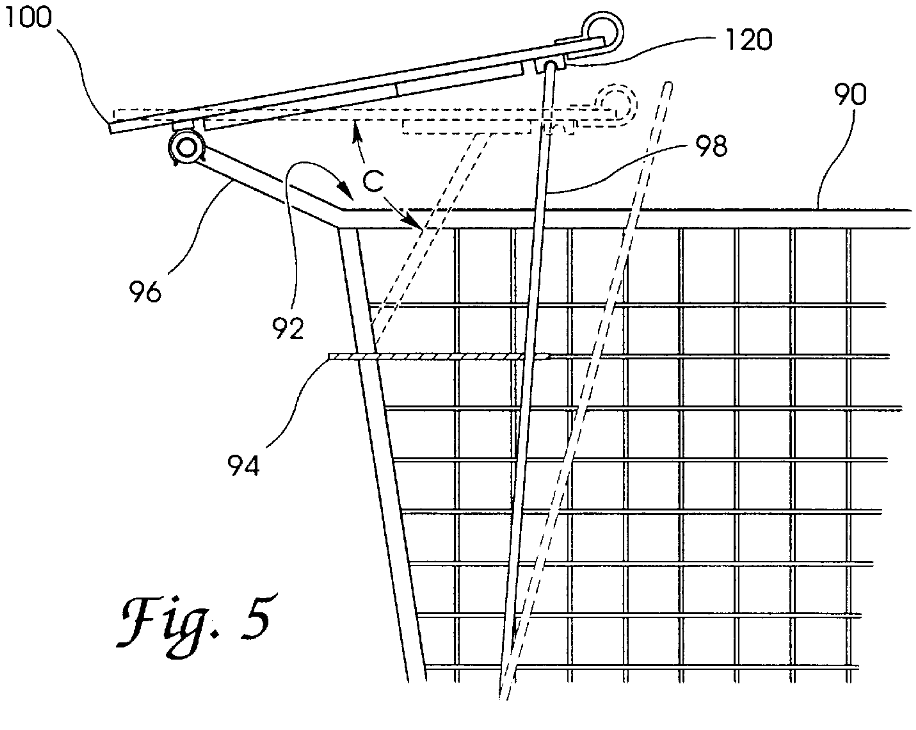
FIG. 5 is a side elevational view of an alternate embodiment of the portable clipboard depicted in FIG. 3.

Other portable clipboards are also contemplated for use with portable maps 10 or 30 which are designed for use with a particular style of grocery cart. Referring now to FIG. 5, a grocery cart 90 is shown including a seat or small item storage area 92 created by seat or bottom 94 pivotably connected to wire frame 98. As such, grocery cart 90 is typical of conventional carts having a seat which may be folded stored against the back of the cart or unfolded to present a seat or small item storage space adjacent to the back of the grocery cart.

A portable clipboard 100 specifically adapted to this style of grocery cart extends between handle 96 and wire frame 98 of grocery cart 90. Portable clipboard 100 is clamped to handle 96 and rests on wire frame 98 to provide a stable writing surface with respect to grocery cart 90. Portable clipboard 100 also includes a swing arm assembly similar to swing arm assembly 68 of clipboard 50 that unfolds (angle C) so that clipboard 100 can rest against seat 94 with a portable map displayed in an alternate position.

Figure 6:
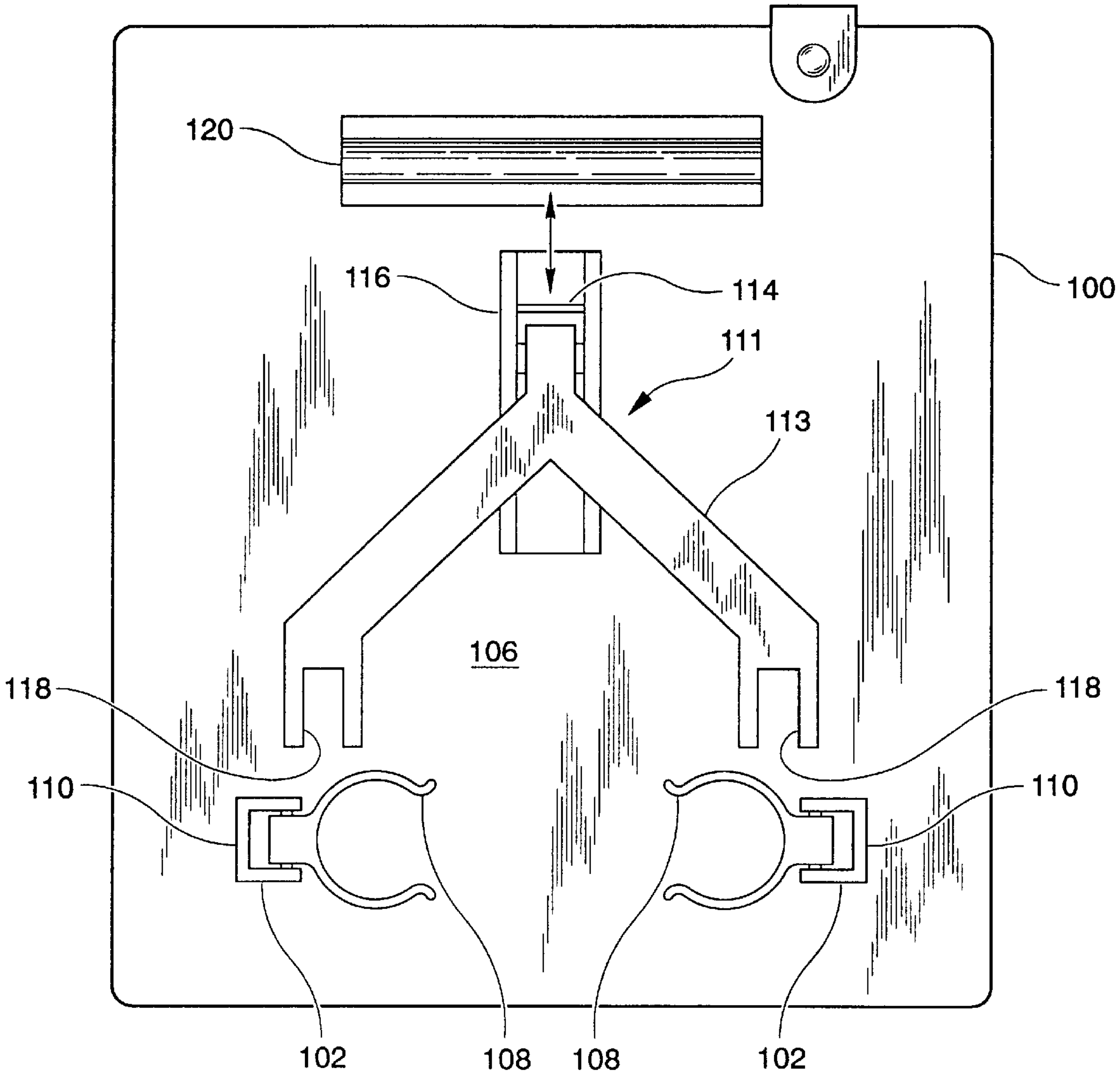
FIG. 6 is a rear elevational view of the portable clipboard depicted in FIG. 5.

Referring now to FIG. 6, similar to bracket 66 of clipboard 50, pivotable clamp assemblies 102 are attached to back surface 106 for receiving transverse handle 96 therein. Each clamp assembly includes a C-shaped resiliently flexible clip 108 pivotably connected to a bracket 110, wherein clips 108 are movable between stored and extended positions. Similar to swing arm assembly 68 of clipboard 50, clipboard 100 includes a swing arm assembly 111 attached to back surface 106. Swing arm assembly 111 includes a Y-shaped arm 113 pivotably connected to bracket 114. However, unlike swing arm assembly 68 of clipboard 50, bracket 114 is sidably mounted to back surface 106 via guide track 116. As such, arm 113 both pivots and translates from its stored position to its extended position to provide a more compact assembly. Grooves 118 are disposed at ends of arm 113 for receiving and resting against vertical rails and against the seat of cart 90. Preferably, a magnetized bracket 121 is attached near the top of back surface 64 so that clipboard 50 can be magnetically hung against a vertical working surface, such as that provided by a refrigerator. Individual components of the clipboard can be rubberized, such as for example arm 113, for both increased gripping and cushioning of clipboard 100 against cart 90 when swing arm assembly 111 is in its extended position and clipboard 100 rests on cart 90.

Figure 7:
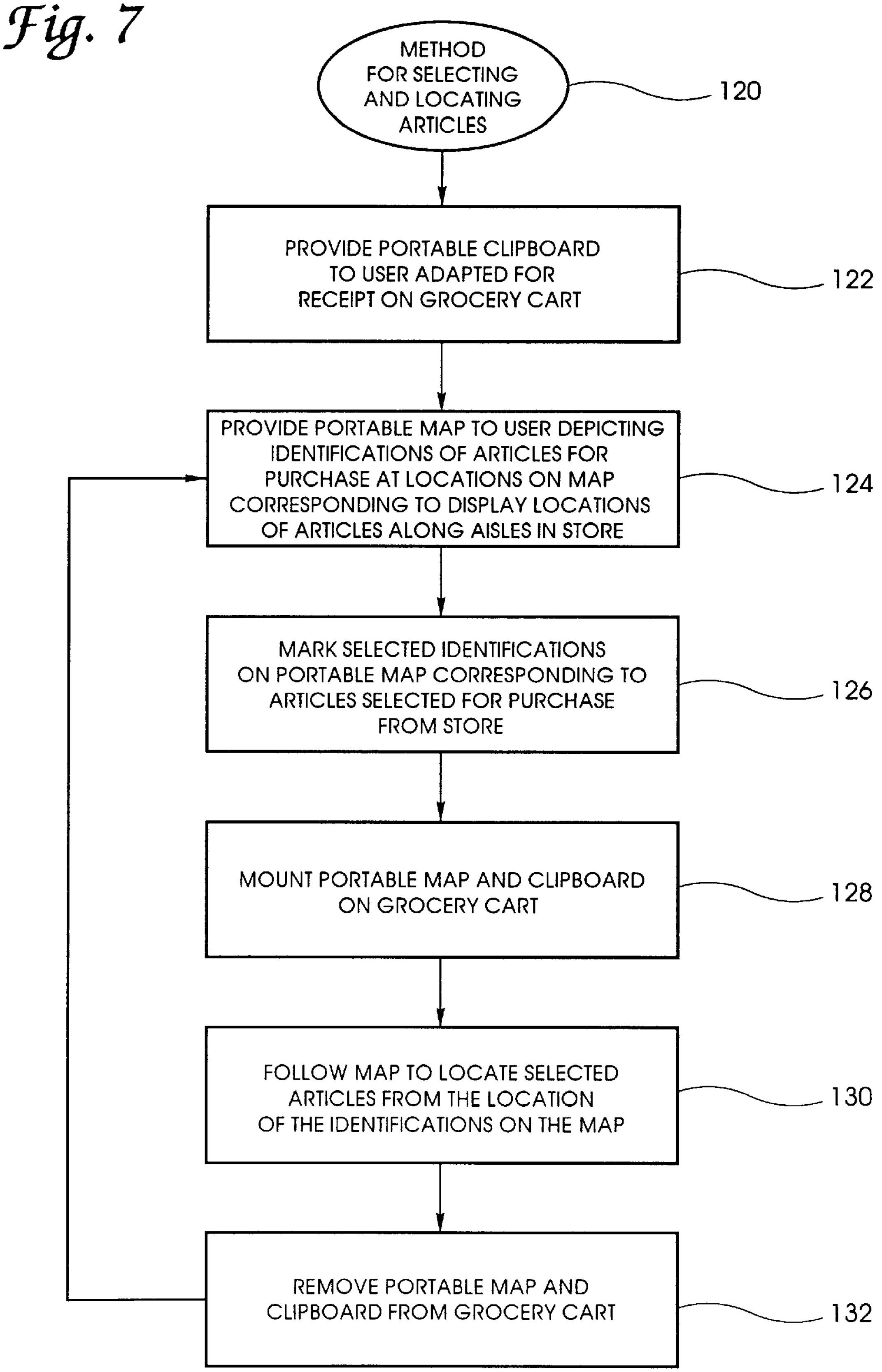
FIG. 7 is a flow chart describing a method for selecting and locating articles in a store according to another embodiment of the present invention.

Referring now to FIG. 7, a method 120 for aiding shoppers in the selection and location of articles for sale at various aisle locations in a store is depicted. In the preferred embodiment, a portable clipboard is made available to the shopper at step 122, such as either clipboard 50 or clipboard 100 which are adapted for receipt on conventional grocery carts. Clipboards 50 and 100 are contemplated constructed of a lightweight and inexpensive, yet durable material so that the clipboards can be either sold or given away to shoppers, perhaps after purchasing a predetermined amount of goods at the particular store. In either case, as indicated in FIG. 7, the clipboard is retained by the shopper for repeated use.

Next, one or more portable maps are made available to the shopper at step 124, wherein the portable maps depict identifications of articles at locations on the map corresponding to the display locations of the articles along aisles in the store. As previously discussed in conjunction with portable maps 10 or 30, the portable maps are provided either as individual sheets or in pads of 25 or more. The shopper marks selected identifications on the portable map corresponding to articles selected by the shopper for purchase from the store at step 126, such as by making marks 17 or marks 33. Because both the map and the clipboard are easily portable between home and store, the shopper may choose to keep the portable clipboard mounted in the kitchen readily available as a shopping list for marking items as the need for the item arises. Because the clipboard is also mountable to a grocery cart, the shopper merely transports the clipboard and map to the store to begin shopping. At the store, the shopper mounts the portable clipboard and map on the grocery cart at step 128 and follows the map to locate the selected articles for purchase at the store at step 130. When the shopping trip is complete, the shopper simply discards the old map and removes the clipboard from the grocery cart at step 132 so that the clipboard is retained for repeated use with other portable maps.

Figure 8:
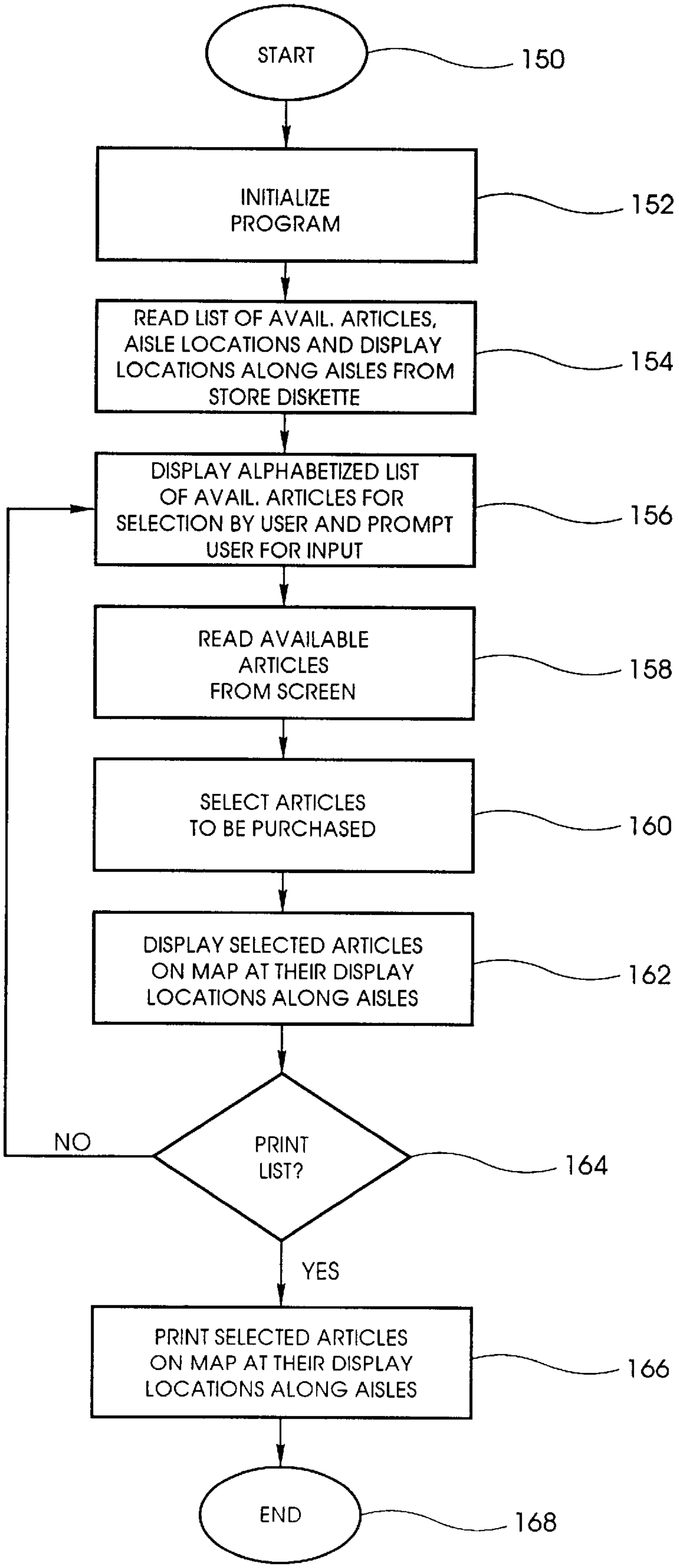
FIG. 8 is a flow chart describing a method usable in a computer program for providing a personalized shopping map according to yet another embodiment of the present invention.

In addition to portable maps 10 and 30 being pre-printed by the store and made available to the shopper, also contemplated is a store-provided conventional hard or floppy computer disk having a list of articles available at the store and their respective aisle locations and display locations stored thereon. Referring now to FIG. 8, one example of a computer program for use with such a store-provided diskette is shown commencing at step 150. Program execution advances to step 152 where the computer program is initialized, for example, by erasing previously stored lists of articles, aisle locations and display locations. Program execution advances to step 154 where the current list of available articles, aisle locations and display locations are read from the store-provided computer diskette.

At step 156, the list of available articles is displayed alphabetically for selection by the user, and the user is prompted for input. Preferably, at step 158 articles available to the user are read directly from the screen display. The articles are next selected by the user, such as by a key stroke entry on a portable computer at home, at step 160. At step 162, the articles selected by the user (and preferably only those articles selected) are displayed on a map of the store at their display locations along the aisles. At step 164, program execution continues if the shopping list is ready for print. If not, program execution returns to step 156 to again display the list of available articles for selection by the user. At step 166, the articles selected for purchase by the user are printed on a map at their display locations along the aisles, and program execution ends at step 168. As before, preferably only those articles selected are printed so as to minimize clutter on the map.

As such, a personalized shopping map and list is created which shows only the articles "marked" or selected for purchase by the shopper at their respective display locations. The shopper merely follows the map to locate the article and crosses off that article when located and placed in their shopping cart. In doing so, the shopper can easily ascertain remaining articles for purchase or when all the articles on the list have been purchased by visually inspecting the personalized shopping map. In this way, the shopper can efficiently gather all things on their list the first time through the store without having to back-track to aisles previously traveled.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for aiding shoppers in the selection and location of articles displayed for sale at various aisle locations in a store having a plurality of aisles therein, said store including numerous discrete articles displayed at various display locations along said plurality of aisles, comprising:

a portable map including a display surface bearing store specific indicia arranged in a pictorial representation of said plurality of aisles;

said store specific indicia comprising first written identifications sufficiently detailed in descriptiveness to correspond to said discrete articles, said identifications showing said discrete articles arranged at locations in said pictorial representation corresponding to the display locations of said articles along said plurality of aisles; and wherein said portable map is usable as a shopping list for selecting discrete articles for purchase from said store and as an in-store map for locating said selected discrete articles in said store.

2. The system of claim 1, wherein:

said store specific indicia further includes outlines of said display locations arranged in said pictorial representation to define said plurality of aisles; and said first written identifications are arranged in said outlines corresponding to said display locations of said articles along said plurality of aisles.

3. The system of claim 2, wherein:

said portable map is constructed of paper; and said store specific indicia is printed on said portable map.

4. The system of claim 3, wherein said store specific indicia is printed in a light colored ink.

5. The system of claim 4, and further comprising:

a written index of said first written identifications displayed on said display surface adjacent to said pictorial representation;

said written index including said first written identifications arranged in alphabetical order and associated with second written identifications of said display locations along said plurality of aisles.

6. The system of claim 5, wherein:

said portable map includes at least one fold line in said pictorial representation; and said portable map is foldable along said fold line to define first and second sides and display a minor portion of said pictorial representation on one of said first or said second sides.

7. The system of claim 6, wherein said light colored ink is colored in a shade of red.

8. The system of claim 1, and further comprising:

a written index of said first written identifications displayed on said display surface adjacent to said pictorial representation;

said written index including said first written identifications arranged in alphabetical order and associated with second written identifications of said display locations along said plurality of aisles.

9. The system of claim 8, wherein:

said written index includes third written identifications of articles not included in said pictorial representation;

said written index including said third written identifications arranged in alphabetical order and associated with fourth written identifications of display locations of said articles not included in said pictorial representation.

10. The system of claim 1, wherein:

said portable map includes at least one fold line in said pictorial representation; and said portable map is foldable along said fold line to define first and second sides and display a minor portion of said pictorial representation on one of said first or said second sides.

11. A system for aiding shoppers in the selection and location of articles displayed for sale at various aisle locations in a store having a plurality of aisles therein, said store including numerous discrete articles displayed at various display locations along said plurality of aisles, comprising:

a portable map including a display surface bearing store specific indicia arranged in a pictorial representation of said plurality of aisles;

said store specific indicia comprising first written identifications of said articles arranged at locations in said pictorial representation corresponding to the display locations of said articles along said plurality of aisles; and wherein said portable map is usable as a shopping list for selecting articles for purchase from said store and as an in-store map for locating said selected articles in said store;

a portable board for receiving and supporting said portable map thereon;

said portable board including means for removably mounting to rails of a grocery cart, said means for removably mounting being operable between a stored position for supporting said board stable against a working surface and an extended position for supporting said clipboard stable mounted on said grocery cart;

a planar member having a first surface for supporting said portable map and a second surface;

a transverse bracket attached to said second surface, said transverse bracket including a groove for receiving a transverse rail of said grocery cart therein;

a swing arm pivotably attached to said second surface, said swing arm including a clamp at an end thereof for clamping to a vertical rail of said grocery cart and being movable between a first position adjacent said second surface and a second position clamped to said vertical rail; and a resiliently flexible clip attached to said second surface, said resiliently flexible clip clipping to a longitudinal rail of said grocery cart.

12. The system of claim 11, wherein said portable board includes means, attached to said second surface, for hanging said clipboard.

13. A system for aiding shoppers in the selection and location of articles displayed for sale at various aisle locations in a store having a plurality of aisles therein, said store including numerous discrete articles displayed at various display locations along said plurality of aisles, comprising:

a portable map including a display surface bearing store specific indicia arranged in a pictorial representation of said plurality of aisles;

said store specific indicia comprising first written identifications of said articles arranged at locations in said pictorial representation corresponding to the display locations of said articles along said plurality of aisles; and wherein said portable map is usable as a shopping list for selecting articles for purchase from said store and as an in-store map for locating said selected articles in said store;

a portable board for receiving and supporting said portable map thereon;

said portable board including means for removably mounting to rails of a grocery cart, said means for removably mounting being operable between a stored position for supporting said board stable against a working surface and an extended position for supporting said clipboard stable mounted on said grocery cart;

a planar member having a first surface for supporting said portable map and a second surface;

a pivotable clip attached to said second surface, said pivotable clip clipping to a handle of said grocery cart and being movable between a first position adjacent said second surface and a second position clipped to said handle;

a pivotable swing arm slidably attached to said back surface between first and second positions, said pivotable swing arm including a groove for receiving a transverse rail of said grocery cart therein and being movable between a stored position adjacent to said second surface and an extended position receiving said transverse rail.

14. A method for aiding shoppers in the selection and location of discrete articles displayed for sale at various aisle locations in a store, comprising the steps of:

providing a portable map including a display surface bearing store specific indicia arranged in a pictorial representation of aisles in the store, said store specific indicia including written identifications of said discrete articles sufficiently detailed in descriptiveness to correspond to said discrete articles arranged at locations in said pictorial representation corresponding to display locations of said discrete articles along said plurality of aisles;

marking at least one selected written identification on said portable map corresponding to discrete articles selected for purchase from said store; and following said pictorial representation along said aisles to locate the selected discrete articles from the location of the marked written identification on said pictorial representation.

15. The method of claim 14 and further comprising the steps of:

providing a clipboard mounted to a grocery cart; and mounting said portable map on said clipboard.

16. The method of claim 15 and further comprising the step of mounting said clipboard against a working surface in said stored position.

17. A system for aiding shoppers, comprising:

a store having a plurality of aisles therein, said store including numerous discrete articles displayed at various display locations along said plurality of aisles;

a portable map including a display surface bearing store specific indicia arranged in a pictorial representation of said plurality of aisles;

said store specific indicia comprising first written identifications sufficiently detailed in descriptiveness to correspond to said discrete articles, said identifications showing said discrete articles arranged at locations of said articles along said plurality of aisles; and wherein said portable map is usable as a shopping list for selecting discrete articles for purchase from said store and as an in-store map for locating said selected discrete articles in said store.

18. A system for aiding shoppers, comprising:

a store having a plurality of aisles therein, said store including numerous articles displayed at various display locations along said plurality of aisles;

a portable map including a display surface bearing store specific indicia arranged in a pictorial representation of said plurality of aisles;

said store specific indicia comprising first written identifications of said articles arranged at locations in said pictorial representation corresponding to the display locations of said articles along said plurality of aisles; and wherein said portable map is usable as a shopping list for selecting articles for purchase from said store and as an in-store map for locating said selected articles in said store;

a portable board for receiving and supporting said portable map thereon;

said portable board including means for removably mounting to rails of a grocery cart, said means for removably mounting being operable between a stored position for supporting said board stable against a working surface and an extended position for supporting said clipboard stable mounted on said grocery cart;

a planar member having a first surface for supporting said portable map and a second surface;

a transverse bracket attached to said second surface, said transverse bracket including a groove for receiving a transverse rail of said grocery cart therein;

a swing arm pivotably attached to said second surface, said swing arm including a clamp at an end thereof for clamping to a vertical rail of said grocery cart and being movable between a first position adjacent said second surface and a second position clamped to said vertical rail; and a resiliently flexible clip attached to said second surface, said resiliently flexible clip clipping to a longitudinal rail of said grocery cart.

19. A system for aiding shoppers, comprising:

a store having a plurality of aisles therein, said store including numerous articles displayed at various display locations along said plurality of aisles;

a portable map including a display surface bearing store specific indicia arranged in a pictorial representation of said plurality of aisles;

said store specific indicia comprising first written identifications of said articles arranged at locations in said pictorial representation corresponding to the display locations of said articles along said plurality of aisles; and wherein said portable map is usable as a shopping list for selecting articles for purchase from said store and as an in-store map for locating said selected articles in said store;

a portable board for receiving and supporting said portable map thereon;

said portable board including means for removably mounting to rails of a grocery cart, said means for removably mounting being operable between a stored position for supporting said board stable against a working surface and an extended position for supporting said clipboard stable mounted on said grocery cart;

a planar member having a first surface for supporting said portable map and a second surface;

a pivotable clip attached to said second surface, said pivotable clip clipping to a handle of said grocery cart and being movable between a first position adjacent said second surface and a second position clipped to said handle;

a pivotable swing arm slidably attached to said back surface between first and second positions, said pivotable swing arm including a groove for receiving a transverse rail of said grocery cart therein and being movable between a stored position adjacent to said second surface and an extended position receiving said transverse rail.

* * * * *